United States Patent [19]

Bronnhuber

[11] 4,251,953
[45] Feb. 24, 1981

[54] METHOD OF AND DEVICE FOR PREVENTING DAMAGE TO PLANT ROOTS BY RODENTS

[75] Inventor: Martin Bronnhuber, Aislingen, Fed. Rep. of Germany

[73] Assignees: Karl Mengele & Söhone Maschinenfabrik; Eisengiesserei GmbH & Co., both of Günzburg, Donau, Fed. Rep. of Germany

[21] Appl. No.: 72,667

[22] Filed: Sep. 5, 1979

[30] Foreign Application Priority Data

Aug. 6, 1977 [DE] Fed. Rep. of Germany ....... 2735513

[51] Int. Cl.³ ............................................ A01G 29/00
[52] U.S. Cl. .................................................... 47/48.5
[58] Field of Search ......................................... 47/48.5

[56] References Cited

FOREIGN PATENT DOCUMENTS 2735513 2/1979 Fed. Rep. of Germany ............ 47/48.5

*Primary Examiner*—Robert E. Bagwill
*Attorney, Agent, or Firm*—Toren, McGeady & Stanger

[57] ABSTRACT

To prevent gnawing damage to plant roots by burrowing rodents, a container holding a non-poisonous repellent agent in a carrier material is placed in the ground adjacent to the roots. The container is formed of an airtight material in a position in the ground its sides and top are closed while its bottom is open.

8 Claims, 1 Drawing Figure

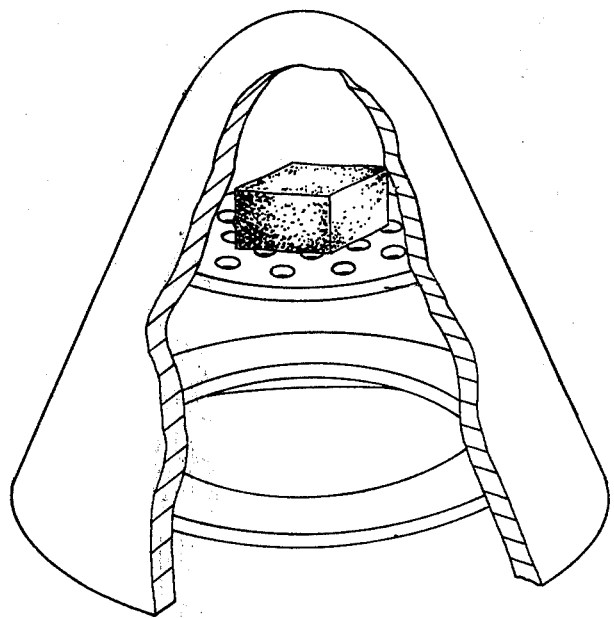

METHOD OF AND DEVICE FOR PREVENTING DAMAGE TO PLANT ROOTS BY RODENTS

SUMMARY OF THE INVENTION

The present invention is directed to a method a and device for preventing gnawing damage by burrowing rodents to plant roots, such as shrubs, ornamental and fruit trees, and the like.

In known methods, evaporating poisons are placed in existing passageways in the ground for destroying the insects, larvae and other materials which serve as food for burrowing rodents and moles, note German Offenlegungsschrift No. 2,130,272. Usually, the passageways are discovered only after the damage has been done to the plant roots. Moreover, destroying the food for the rodents and moles initially produces a rise in the damage to the roots before such burrowing animals leave.

Furthermore, the device used in this method is not effective under all existing conditions. The device or capsule which is inserted into the passageways has openings on its upper sides for admitting ambient air to a cellulose strip in the capsule which is soaked with the evaporable poison. These openings are covered by overhanging caps to prevent water from entering the capsule.

Such caps, however, do not protect against water which runs through the passageways or against ground water, unless the water rises at a uniform level over the openings so that both of them are sealed simultaneously. Such a sealing action seems to occur only in very rare cases.

Other methods use toxic-scented substances deposited in the soil.

In both instances, the toxic material used not only destroys the microorganisms in the area of the roots but also enters into the fruit of the plants involved.

Therefore, it is the primary object of the present invention to provide a system of protecting the plant roots during growth which has no side effects. Further, a device is provided for carrying out the method in which the material containing the repellent is kept free from contact with ground water or other sources of moisture.

In accordance with the present invention, a carrier material soaked with a non-poisonous repellent agent is placed in a container in ground cavities around plant roots and the container is covered with soil.

Further, in accordance with the present invention, the device embodying the present invention includes a container formed of an airtight material provided with closed sides and top and an open bottom when it is positioned in the ground.

Preferably, the carrier material for the repellent agent is supported on a grate located in the upper portion of the container. A thrust ring is provided within the container for anchoring the container in the ground. The thrust ring is located above the open bottom of the container and below the grate supporting the repellent agent carrier material.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING

The drawing is a perspective view, partially cut away, of a container embodying the present invention.

DETAILED DESCRIPTION OF THE INVENTION

In the drawing a container 1 is illustrated having the shape of a cone rounded at its apex or upper end. The container is open at its bottom, however, it is closed at its sides and top. The container is formed of an airtight material for the protection of the cube 4 of a carrier material soaked with a repellent agent. The airtight character of the material forming the container prevents any moisture from reaching the cube 4. A grate 3 is located within the container spaced from its lower end and provides a support for the cube 4. The cube 4 soaked with the repellent agent may be a felt cube. Spaced below the grate 3 and above the open lower end or bottom of the container 1 is a thrust ring 2 secured to the inner wall of the container. Thrust ring 2 prevents the container from sinking too deeply into the soil. In addition, the thrust ring 2 assures that the repellent agent soaked cube 4 does not come into contact with the soil.

Another function of the thrust ring 2 connected to the container wall is to provide a fixed base anchor in a hole formed in the soil near a plant. After the container is placed in the hole, with the thrust ring 2 bearing on the soil, the hole can be refilled with soil covering the container. Due to the airtight nature of the material used for the container, and since it is open only at its lower end, the conically shaped container affords protection against any water entering into it interior and also against ground water rising into its interior. In the event that ground water rises around the container 1, the cube 4 carrying the repellent material is protected by an air bubble which cannot escape through any opening in the sides or top of the container.

Suitable material for use as the repellent agent includes in particular a light fuel oil or petroleum soaked into a porous felt cube 4.

While a specific embodiment of the invention has been shown and described in detail to illustrate the application of the invention principles, it will be understood that the invention may be embodied otherwise without departing from such principles.

What is claimed is:

1. Method of placing agents in the soil for preventing gnawing damage to plant roots by burrowing rodents, wherein the improvement comprises excavating a hole in the ground adjacent to the plant roots, soaking a carrier material with a non-poisonous repellent agent, enclosing the carrier material within a container formed of an airtight material with the container open at the bottom and closed at the sides and top, positioning the carrier material within the container in spaced relation with the open bottom, placing the container with the open bottom thereof facing downwardly within the hole formed in the ground and placing the excavated soil around and over the container in the hole.

2. Method, as set forth in claim 1, placing the carrier material soaked with the non-poisonous repellent agent on a support surface spaced upwardly from the bottom of the container.

3. Method, as set forth in claim 1, including the step of supporting the container in the soil so that the carrier material soaked within the repellent agent is spaced from the soil in which the container is placed.

4. Device for preventing gnawing damage to plant roots by burrowing rodents and moles comprising a container open at the bottom and closed at the lateral sides and top, said container being formed of an airtight material, and a support located within said container and spaced upwardly from the open bottom thereof, and a carrier material soaked with a repellent agent positioned on said support.

5. Device, as set forth in claim 4, wherein said support is a grate.

6. Device, as set forth in claim 4, including a thrust ring extending around and projecting inwardly from the interior surface of said container, said thrust ring spaced upwardly from the bottom of said container and downwardly from said support.

7. Device, as set forth in claim 4, wherein said container has a conically shaped exterior with a rounded apex at the upper end thereof.

8. Device, as set forth in claim 4, wherein said carrier material comprises a porous felt cube and said repellent agent comprises one of a light fuel oil or petroleum.

* * * * *

UNITED STATES PATENT OFFICE
CERTIFICATE OF CORRECTION

Patent No. 4,251,953          Dated February 24, 1981

Inventor(s) Martin Bronnhuber

It is certified that error appears in the above-identified patent and that said Letters Patent are hereby corrected as shown below:

In the heading of the patent [73] should read as follows:

[73]     Assignee:

KARL MENGELE & SÖHNE MASCHINENFABRIK UND
EISENGIESSEREI GMBH & CO.          Günzburg/Donau,
Federal Republic of Germany Signed and Sealed this Twenty-sixth Day of May 1981

[SEAL]

Attest:

RENE D. TEGTMEYER

Attesting Officer          Acting Commissioner of Patents and Trademarks